Feb. 23, 1932.　　F. FIRM, JR　　1,847,002
TROLLEY POLE
Filed July 22, 1931　　2 Sheets-Sheet 1

Frank Firm, Jr.
INVENTOR
BY Victor J. Evans and Co.
ATTORNEY

Feb. 23, 1932.  F. FIRM, JR  1,847,002
TROLLEY POLE
Filed July 22, 1931  2 Sheets-Sheet 2

Frank Firm, Jr.
INVENTOR
BY Victor J. Evans
and Co.
ATTORNEY

Patented Feb. 23, 1932

1,847,002

UNITED STATES PATENT OFFICE

FRANK FIRM, JR., OF KLEIN, MONTANA

TROLLEY POLE

Application filed July 22, 1931. Serial No. 552,483.

This invention relates to trolley poles and it consists in the novel features hereinafter described and claimed.

An object of the invention is to provide a trolley pole especially adapted to be used upon mining motors which travel in tunnels or underground passageways and the pole is so constructed that in the event that the trolley wheel should leave the overhead wire and strike the roof of the tunnel or the roof timbers, the pole sections may swing with relation to each other whereby the wheel will not be damaged by being held tightly against the tunnel roof or the timbers. The sections of the trolley pole are pivotally connected together in such manner that that section which carries the trolley wheel may swing in either of two directions and thus the wheel will not be damaged if the motor is proceeding in a forward direction or is backing in the tunnel.

With this object in view the trolley pole includes upper and lower pole sections, the upper section being provided with the usual trolley wheel and the lower pole section adapted to be pivotally connected with the motor in a usual manner. Bar sections are attached to the ends of the pole sections and the said bar sections are provided at their sides with recesses. An intermediate bar is provided at its opposite ends and at opposite sides with recesses and the side wall of one recess of the intermediate bar fits snugly against the side wall of the recess of one of the bar sections while the side wall of the other recess of the intermediate bar fits snugly against the side wall of the recess of the other bar section. Pivot members connect the intermediate bar with the bar sections at points between the ends of the recesses thereof and springs are connected at their inner ends with the intermediate bar and at their outer ends with the bar sections and the said springs are disposed transversely across said pivot members.

In the accompanying drawings:—

Figure 1 is a side elevational view showing the trolley poles in heavy lines and the relative position of the parts when the wheel is in contact with the overhead wire and the motor to which the pole is attached is moving in a forward direction. The said figure also indicates in dotted lines the relative positions of the parts when the wheel leaves the overhead wire and the motor is moving in a forward direction and also when the motor is backing.

Figure 1:
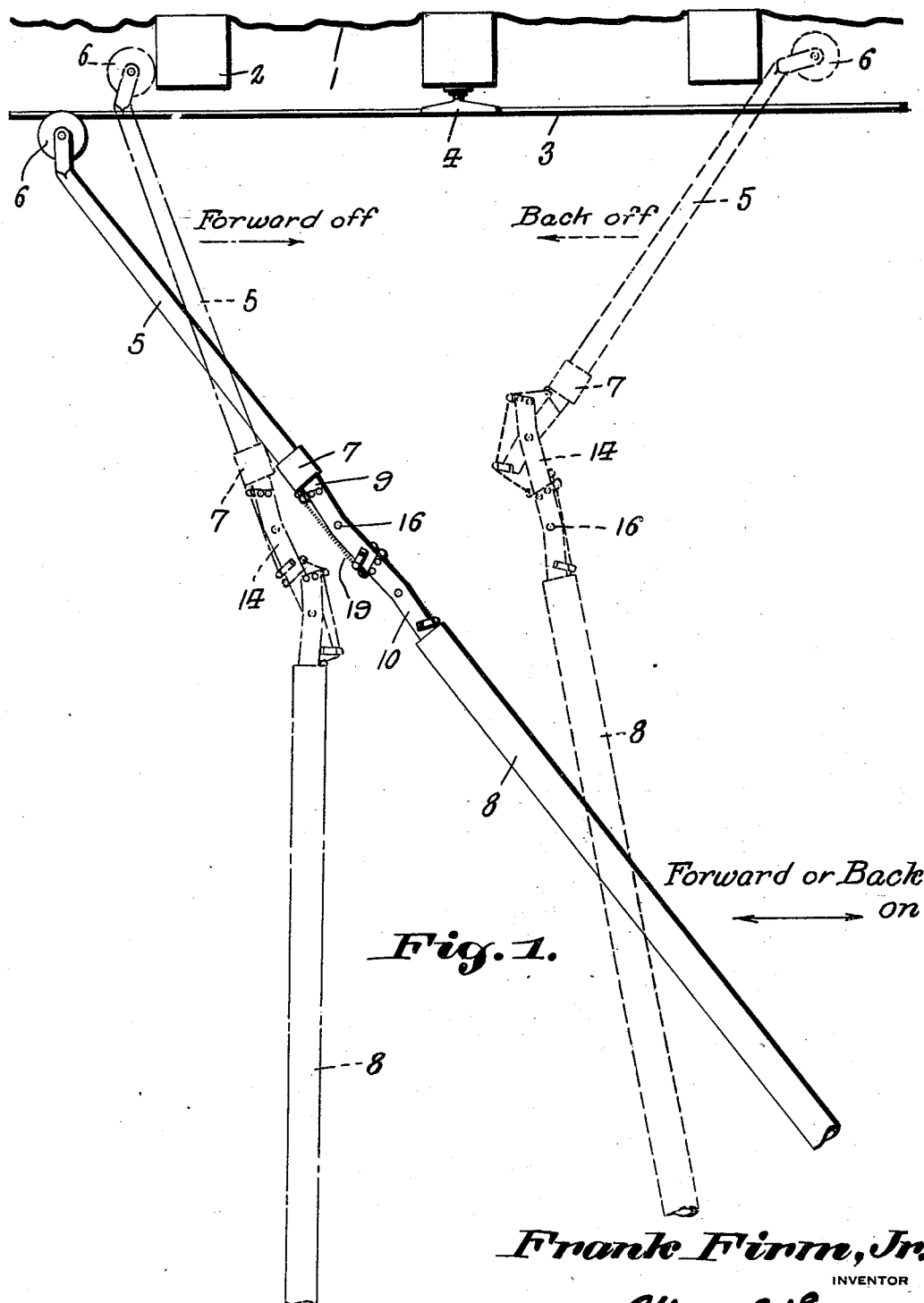

In the accompanying drawings the roof of the tunnel is indicated at 1, the roof timbers at 2 and the overhead wire at 3. The wire 3 is supported from the timbers by hangers in a usual manner. One hanger is indicated at 4.

The trolley pole consists of an upper section 5 having a wheel 6 journaled at the upper end thereof in a usual manner and adapted to travel normally upon the overhead wire 3. A ferrule 7 is connected with the lower end of the upper section 5. The pole also includes a lower pole section 8. The section 8 is connected with the motor (not shown) in a usual manner and the said section 8 is under the influence of a spring (also not shown) as is the common practice. Bar sections 9 and 10 are connected with the pole sections 5 and 8 respectively, the bar section 9 being connected with the pole section 5 through the ferrule 7. The bar sections 9 and 10 have angularly disposed end portions as best shown and indicated in Figure 2 of the drawings. The bar sections 9 and 10 are provided at their sides with recesses 11 leading in from the ends thereof. The inner end walls of the recesses 11 are inclined as at 12. The outer ends of the bar section are inclined as at 13, the ends 13 are inclined in an opposite direction from the inclination of the end walls 12.

Figure 2:
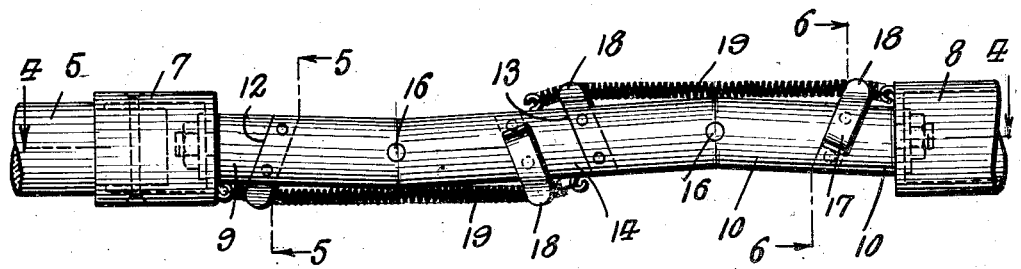
Figure 2 is a side elevational view of the intermediate bar and bar sections.
Figure 3:
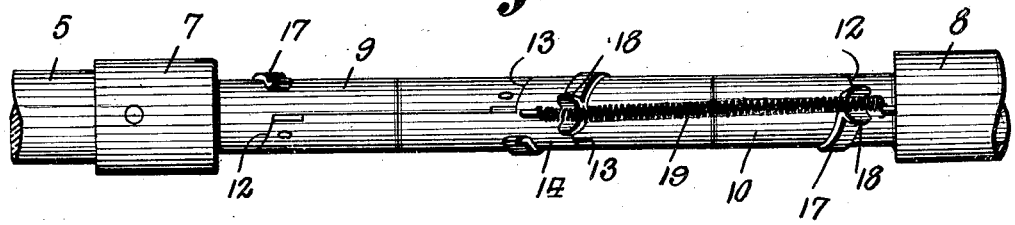
Figure 3 is a similar view at right angles to the view shown in Figure 2.
Figure 4:
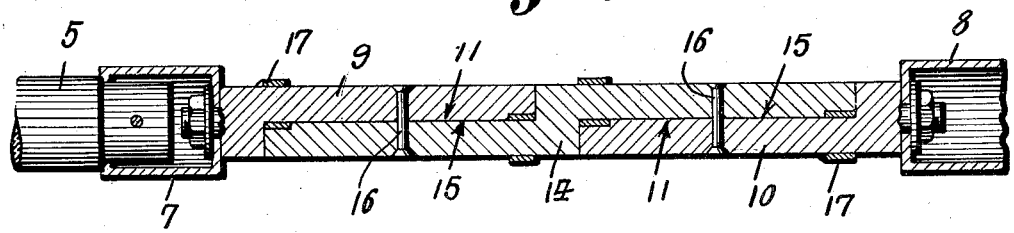
Figure 4 is a horizontal sectional view cut on the line 4—4 of Figure 2.
Figure 5:
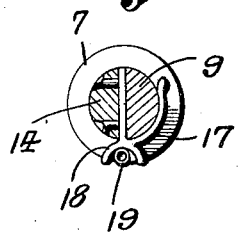
Figure 5 is a transverse sectional view cut on the line 5—5 of Figure 2.
Figure 6:
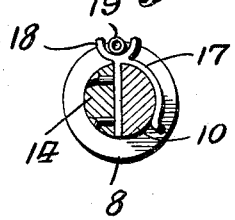
Figure 6 is a transverse sectional view cut on the line 6—6 of Figure 2.

An intermediate bar 14 is provided at its opposite ends and at opposite sides with recesses 15 and the inner wall surfaces of the recesses 15 fit snugly against the side wall surfaces of the recesses 11 of the bars 9 and 10 respectively. The end portions of the intermediate bar 14 are angularly disposed with relation to the intermediate portion thereof as best indicated in Figure 2 of the drawings. Pivot members 16 pass transversely through the intermediate bar 14 and the bar sections 9 and 10 and pivotally connect the bar sections with the intermediate bar. The intermediate bar is provided with end surfaces and intermediate surfaces adapted to fit snugly against the surfaces 12 and 13 of the bar sections 9 and 10. Spring clamps 17 are carried at the ends of the bar 14 and the ends of the bar sections 9 and 10 and the clamps which are carried by the bar are adapted to engage around the bar sections while the clamps which are carried by the bar sections are adapted to engage around the bar as best shown in Figures 5 and 6 of the drawings. Each clamp member 17 is provided with a seat 18. Springs 19 are connected at their inner ends with the bar 14 and connected at their outer ends with the pole sections 5 and 8 respectively. The intermediate portion of the springs 19 are received within the seat 18 as best indicated in Figure 2 of the drawings.

When the trolley pole is moving in a forward direction or backing and the wheel 6 is in contact with the wire 3 the parts will be in position as shown in heavy lines in Figure 1 of the drawings. Should the pole be going in a forward direction and the wheel 6 leave the wire 3 the parts will assume the positions as shown in dotted lines at the left in Figure 1. Should the trolley pole be backing and the wheel leave the wire 3 the parts will assume the positions as shown in dotted lines at the right in Figure 1.

Having described the invention what is claimed is.

1. A trolley pole comprising upper and lower pole sections, bar sections attached to the ends of the pole sections, said bar sections having recesses at their sides, an intermediate bar provided at its opposite ends and at opposite sides with recesses, the side wall of one recess of the intermediate bar fitting snugly against the side wall of the recess of one bar section, the side wall of the other recess of the intermediate bar fitting snugly against the side wall of the recess of the other bar section, pivot members connecting the intermediate bar with the bar sections at points between the ends of the recesses thereof, and springs connected with the intermediate bar and the bar sections and disposed transversely across said pivot members.

2. A trolley pole comprising upper and lower pole sections, bar sections attached to the ends of the pole sections, said bar sections having recesses at their sides, an intermediate bar provided at its opposite ends and at opposite sides with recesses, the side wall of one recess of the intermediate bar fitting snugly against the side wall of the recess of one bar section, the side wall of the other recess of the intermediate bar fitting snugly against the side wall of the recess of the other bar section, pivot members connecting the intermediate bar with the bar sections at points between the ends of the recesses thereof, and springs connected with the intermediate bar and the bar sections and disposed transversely across said pivot members and the bar sections and intermediate bar having angularly disposed end portions.

3. A trolley pole comprising upper and lower pole sections, bar sections attached to the ends of the pole sections, said bar sections having recesses at their sides, an intermediate bar provided at its opposite ends and at opposite sides with recesses, the side wall of one recess of the intermediate bar fitting snugly against the side wall of the recess of one bar section, the side wall of the other recess of the intermediate bar fitting snugly against the side wall of the recess of the other bar section, pivot members connecting the intermediate bar with the bar sections at points between the ends of the recesses thereof, and springs connected with the intermediate bar and the bar sections and disposed transversely across said pivot members and the recesses of the bar sections and intermediate bar and the ends of the bar sections and intermediate bar having inclined surfaces.

4. A trolley pole comprising upper and lower pole sections, bar sections attached to the ends of the pole sections, said bar sections having recesses at their sides, an intermediate bar provided at its opposite ends and at opposite sides with recesses, the side wall of one recess of the intermediate bar fitting snugly against the side wall of the recess of one bar section, the side wall of the other recess of the intermediate bar fitting snugly against the side wall of the recess of the other bar section, pivot members connecting the intermediate bar with the bar sections at points between the ends of the recesses thereof, and springs connected with the intermediate bar and the bar sections and disposed transversely across said pivot members and spring clamped members carried by the bar and the bar sections, the clamp members carried by the bar adapted to engage the bar sections and the clamp members carried by the bar sections adapted to engage the bar.

5. A trolley pole comprising upper and lower pole sections, bar sections attached to the ends of the pole sections, said bar sections having recesses at their sides, an intermediate bar provided at its opposite ends and at opposite sides with recesses, the side wall of one recess of the intermediate bar fitting snugly against the side wall of the recess of one bar section, the side wall of the other recess of the intermediate bar fitting snugly against the side wall of the recess of the other bar section, pivot members connecting the intermediate bar with the bar sections at points between the ends of the recesses thereof, and springs connected with the intermediate bar and the bar sections and disposed transversely across said pivot members and clamp members carried by the bar and bar sections said clamp members having seats receiving said springs.

In testimony whereof I affix my signature.

FRANK FIRM, Jr.